United States Patent Office 3,751,366
Patented Aug. 7, 1973

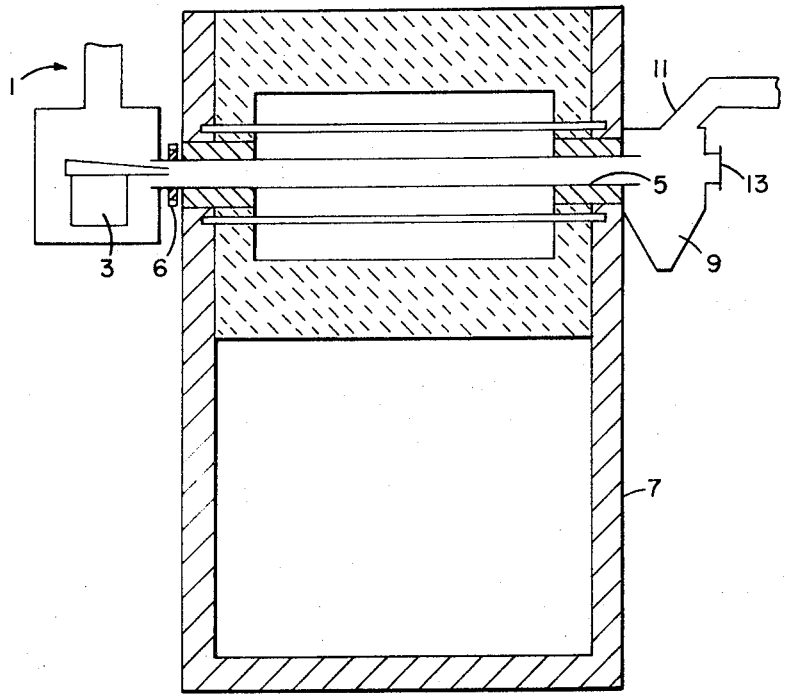
FIG. 2
PROCESS
WEIGH SALTS, OXIDES OR METALS
DISSOLVE AND MIX
SPRAY DRY
PRESINTER
MILL
FORM
SINTER
FIG. I
Steve H. Bomar, Jr.
Robert B. Clem
Richard L. Buckelew,
INVENTORS.
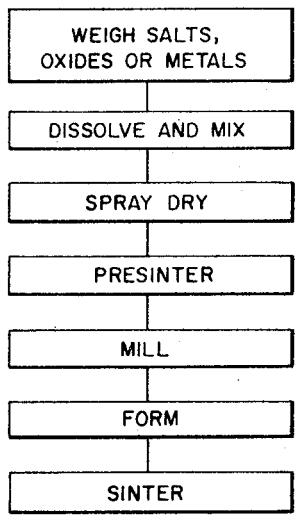

3,751,366
PROCESS FOR PREPARING FERRITE AND GARNET RAW MATERIALS FOR MICROWAVE APPLICATIONS
Steve H. Bomar, Jr., Atlanta, Ga., and Robert B. Clem, Huntsville, and Richard L. Buckelew, Arab, Ala., assignors to the United States of America as represented by the Secretary of the Army
Filed June 4, 1971, Ser. No. 149,966
Int. Cl. C04b 35/26, 35/40
U.S. Cl. 252—62.57       8 Claims

ABSTRACT OF THE DISCLOSURE

A novel process for preparing ferrite and garnet materials by mixing desired metal salts in the form of aqueous solutions, spray drying said aqueous solutions to form a powdery material, presintering the powdery material in an air or oxygen atmosphere to convert the material to mixed oxides having a ferrimagnetic crystal structure, in some cases milling the presintered material to break up the particles, molding into the desired form the resulting powder whether milled or not, and last, sintering the formed material by heating to the desired temperature for sintering.

BACKGROUND OF THE INVENTION

Ferrite and garnet phase shifter devices in microwave applications such as phased array radar systems require careful matching of the electromagnetic characteristics of a large number of elements. The primary obstacle to broad use of ferrite or garnet phasers in electronically scanned arrays is excessive cost. One of the chief contributors to this high cost is the lack of batch-to-batch reproducibility in ferrites or garnets produced by the usual commercial manufacturing process. This lack of reproducibility is believed to be caused by the following features of the conventional process: (1) solid raw materials have variabilities in their chemical properties which are beyond the ability of present technology to control; (2) the ferrimagnetic crystal structure must be formed by solid state diffusion among particles of different metal oxides, requiring that severe presintering conditions be employed to achieve homogeneity in the product, such presintering conditions in turn requiring a subsequent lengthy ball milling step; and (3) some of the processing steps used in the conventional manufacturing process are inherently difficult to perform reproducibly. Therefore it can be clearly seen that a simpler and more controllable process is needed by which ferrite and garnet materials can be produced for microwave application.

Accordingly, it is an object of this invention to provide a process which can be used to more cheaply produce ferrite and garnet phase shifter devices.

Another object of this invention is to provide a process that uses metallic salts in aqueous solution as starting materials.

Still another object of this invention is to spray dry the solutions of metallic salts so as to achieve mixtures of salts and oxides with each particle having a desired composition and particle size when fully dried.

Still another object of this invention is to provide a process that has steps such that they are readily adaptable to a continuous rather than batch operation.

Still another object of this invention is to utilize metal salt solutions in which the metals can be brought into intimate relation one to the other in the liquid state and to maintain this intimate relation between the several metals as they are being spray dried and formed into a powdery or solid state.

SUMMARY OF THE INVENTION

In accordance with this invention, it has been discovered that metal salts such as chlorides, nitrates and sulfates can be dissolved in water and mixed in desired proportions to form an intimately mixed solution of metal salts that can then be spray dried by injecting the salts into a heated atmosphere to evaporate the water and cause the metal salts to be collected as a solid or powdery material. The resulting powdery solid material is an intimate mixture of the various metal salts, probably also containing oxides produced by salt decomposition. After spray drying, the solid particles are presintered or calcined to completely convert the metal salts to metal oxides by heating the powder in an appropriate atmosphere of air or oxygen to a predetermined temperature. During this presintering step the ferrimagnetic crystal structure is developed (a spinel structure in the case of ferrites or a garnet structure in the case of garnets). The presintered material is then sometimes run through a mill device to break up the particles in preparation for forming; at other times, depending on starting materials, the milling step is not necessary. The material is then placed in a form and pressed to cause the material to maintain a desired configuration, and finally, the formed material is sintered. The temperatures used for sintering will depend upon the metal oxides that make up the ferrite or garnet material. The process of this invention can be used in making spinel structures of the general formula $MFe_2O_4$, wherein M=a selected metal or metals, and the garnets of the general formula $Y_3Fe_5O_{12}$, wherein Y=yttrium, a rare earth metal, or combinations of yttrium and rare earths.

BRIEF DESCRIPTION OF THE DRAWING

FIG. 1 is a flow diagram illustrating the steps taken in carrying out the process of this invention, and FIG. 2 is a schematic representation of a rotary calcining machine that can be used in presintering the materials and also used when a continuous process is to be pursued.

DETAILED DESCRIPTION OF THE INVENTION

Referring now to FIG. 1, this process involves (1) weighing the raw materials (salts, metals or oxides) in the appropriate amounts, (2) dissolving the salts in water, or if metals or oxides are used dissolving these in aqueous acid solutions to obtain solutions of salts in water, then mixing the individual salt solutions in the desired proportions and concentrations, (3) spray drying by feeding the mixed salt solution into a spray dryer at a predetermined rate and into a predetermined atmosphere of the spray dryer to produce dried crystals as the powdery material comes from the spray dryer, (4) presintering the powdery material by placing the powdery material in a tray and heating the powdery material in an oven to a predetermined temperature or presintering by running the powdery material through a rotary calcining machine as illustrated in FIG. 2, (5) after presintering, placing the material in a milling machine to reduce the particle size of the material as it comes from the presintering or rotary calcining machine, (6) forming the milled material into a desired form and pressing it to the desired shape, and (7) finally, sintering the material to the desired density and ultimate configuration by heating to the appropriate temperature. In some cases step (5) may not be required, and in this event the presintered powder may be formed without milling. This process is not limited to any one particular material, but may be used on various ferrite and garnet materials that are made using nitrate, sulfate or other salts. The examples given below are given only as examples of materials that can be prepared by this process.

EXAMPLE I

The production techniques for the ferrite composition $(Fe_2O_3) \cdot (MgO)_{1.611} \cdot (MnO)_{0.128}$ are set forth herein below.

(1) Solution preparation

Solutions for spray drying are prepared by dissolving reagent grade nitrate salts in deionized water. Stock solutions of ferric nitrate and magnesium nitrate are made up from salt crystals with a nominal concentration of 25 percent by weight of anhydrous nitrate salts. Manganese nitrate is purchased as an aqueous solution containing 50 percent by weight of the anhydrous salt.

The stock solutions are analyzed by a wet chemical method to determine their exact concentrations of metal ions. The analytical method employs ethylene diamine tetra-acetic acid (as the standard reagent). This analytical method of concentration determination is disclosed by H. A. Flaska, ETDA Titrations, Pergamon Press, 138 pp., New York, N.Y., 1959. The analysis step is necessary because the ferric and magnesium nitrate crystals are hydrated salts whose formulas are only approximately known. After the exact concentration of each stock solution has been determined, they are mixed by weight in the proportions necessary to obtain the desired metal ion ratios. In the present case these ratios are given by the formula $(Fe_2O_3) \cdot (MgO)_{1.611} \cdot (MnO)_{0.128}$.

Since all the stock solutions were mixed to contain about 25 percent by weight of their respective metal nitrates (excluding water of hydration), the solution to be spray dried preferably contains about 25 percent metal nitrates and 75 percent water.

(2) Spray drying

The spray dryer is started up and operating conditions are established by atomizing water into the drying chamber. The water or prepared solution to be spray dried is preferably sprayed through a two-fluid or pneumatic nozzle in which the atomizing stream is air. Nominal flow rates and temperatures are established and the dryer is run for approximately one hour under these conditions. This is to insure that the chamber walls and all the conduits are warmed to an equilibrium temperature. When the outlet air temperature gauge indicates that the desired outlet temperature has been reached and is holding steady at the end of the one hour warm-up period the dryer is ready for operation. The prepared solution is transferred from its storage container to the feed container of the spray dryer. The atomizing air pressure is checked to insure that it is at the desired setting and the inlet and outlet air temperatures are checked. The feed container is switched into the line and the water container, which has been feeding water into the drying chamber is switched out. The drying operation has now begun. The process variables that are monitored are the atomizing air pressure, the feed rate, the hot gas inlet temperature and outlet temperature, and the stack gas velocity and temperature. These values are recorded during the run. The dried powder is collected in a glass container at the solid outlet of the cyclone separator of the spray dryer or could be fed directly into a calcining device as illustrated in FIG. 2.

It has been established that high operating temperatures and atomizing air pressure along with low liquid flow rates give the most satisfactory spray dried powder. Powders made with these operating conditions are preferred for several reasons: (1) small ultimate particle size, generally 1 to 5 microns after presintering, and (2) presintering the powders remain in the form of discrete particles, no melting is observed because the powders are partially decomposed to oxides during spray drying.

Table I below lists spray dryer runs IX–XVI. The atomizing air pressure of these runs was varied from 80 to 120 p.s.i.g. and small variations were made in the solution flow rate. These changes were intended to reduce particle sizes so that later the milling step could be eliminated. Milling is described in more detail later, but for the present it should be noted that milling could not be eliminated when solutions of nitrate salts were sprayed dried. It should further be noted that higher spray dryer outlet temperatures gave lower weight loss on presintering. This was caused by the fact that more decomposition occurred in spray drying when the outlet temperatures were higher.

TABLE I.—SUMMARY OF FERRITE SPRAY DRYER RUNS

| Run No. | Hot gas temp. Inlet (° F.) | Hot gas temp. Outlet (° F.) | Precursor solution Flow rate (gal./hr.) | Precursor solution Air press. (p.s.i.g.) | Precursor solution Quantity (gm.) | Dried powder Quantity (g.m) | Dried powder Loss on presintering (wt. percent) | Dried powder Ultimate particle size (μ) | Remarks |
|---|---|---|---|---|---|---|---|---|---|
| IX | 700 | 475 | 0.41 | 80 | 8,450 | 846 | 37.0 | 1–5 | |
| X | 700 | 485 | 0.44 | 80 | 5,045 | 400 | 39.7 | 1–5 | |
| XI | 700 | 485 | 0.47 | 80 | 9,626 | 702 | 38.5 | 1–5 | |
| XII | 700 | 500 | 0.51 | 100 | 10,477 | 737 | 34.0 | 1–5 | |
| XIII: A | 700 | 515–530 | 0.38 | 120 | 5,455 | 260 | 35.0 | 1–5 | |
| B | 700 | 515–530 | 0.42 | 100 | 5,308 | 311 | 33.0 | 1–5 | |
| XIV | 700 | 490 | 0.32 | 100 | 11,001 | 821 | 39.0 | 1–5 | |
| XV | 715 | 515–530 | 0.32 | 100 | 10,747 | 738 | 34.0 | 1–5 | |
| XVI | 700 | 505 | 0.52 | 100 | 10,867 | 820 | | | Rotary calcined. |

Although some latitude in spray drying operating conditions appears to be permissible, the following have been selected as optimum for ferrites:

Inlet drying gas temperature: 700° F.
Solution flow rate: 0.5 gal./hr.
Solution concentration: 25% by weight salt
Atomizing air pressure: 100 p.s.i.g.
Stack gas flow rate: 1800 ft.³/min. at 500° F. and 1 atm.
Ultimate particle size of dried powder: 1–5 microns.

(3) Presintering

Spray dried powders are presintered either in batches in an electric furnace or by a rotary presintering apparatus. Batch presintering is accomplished by spreading uniformly on a silica tray a bed depth of about ¼ inch of spray dried powder, then placing the tray in a preheated furnace with air or oxygen atmosphere. Presintering in an oxygen atmosphere yields powders with X-ray diffraction traces identical to traces of powders presintered in air. Presintering temperatures of 1400 to 1600° F. (760 to 871° C.) and times of 3 hours are preferred. However, presintering temperatures of 1200 to 1800° F. and times of 1 to 4 hours may be used in presintering the spray dried powders. In some case, the powder at the top of the presintering bed is a different color than that underneath. Thus, some powders are stirred and presintered for a second time to improve uniformity. Uniformity of presintering can be substantially improved by conducting this step in a rotary presintering apparatus.

A rotary presintering apparatus is illustrated in FIG. 2 that includes a materials transfer system 1 for delivering the spray dried powder from the spray dryer, a vibrator power feeder 3 for delivering the spray dried powder to a round mullite tube 5 that is rotated by conventional rotating means 6, furnace 7 for heating the powdery material to cause it to be calcined or presintered as it passes through the mullite tube to product collection box 9. Product collection box 9 may have preheated air or oxygen entering through duct 11 for flow of the heated air or oxygen through mullite tube 5 as the powdery material is passed therethrough. Also, a sight glass 13 may be provided in the product collection box if desired. In operation, mullite tube 5 is tilted such that when the powdery material enters at one end, it will flow toward the product collection box.

Several batches of ferrite powder were calcined in the rotary presintering apparatus. Two temperatures and two atmospheres were used, then the resulting powders were split into smaller batches. Half of the smaller batches were ball milled dry then fabricated into samples, and the remaining small batches were fabricated into samples without further processing. Then all the samples were sintered using the standard ferrite firing cycle which is described later. Table II below shows the results of this rotary presintering study. It is seen that samples from powder presintered at 1400° F. in air had the highest fired densities. These densities were equivalent to those attained with bed presintering.

TABLE II.—DATA ON ROTARY PRESINTERING OF FERRITES

| Presintering temperature (° F.) | Presintering atmosphere | Ball milling time (dry) (hr.) | Sintered density range $\rho_{theo}=4.436$ gm./cm.$^3$) (percent of $\rho_{theo}$) |
|---|---|---|---|
| 1,400 | Air | 0 | 81.9–83.3 |
| 1,400 | Air | 4 | 95.2–95.4 |
| 1,400 | Oxygen | 0 | 82.4–83.1 |
| 1,400 | do | 4 | 87.2–87.4 |
| 1,600 | Air | 0 | 81.2–81.8 |
| 1,600 | Air | 4 | 91.8–92.5 |
| 1,600 | Oxygen | 0 | 80.4–82.5 |
| 1,600 | do | 4 | 90.9–91.8 |

NOTE.—Preferred presintering conditions for ferrites are chosen as—
Rotary presintering temperature_____ 1,400° F.
Presintering atmosphere_____ Air.
Powder residence time_____ 20–25 min.
Powder feed rate_____ 5–10 gm./min.

(4) Milling

Milling is done in a rubber-lined steel mill with stainless steel 304 grinding cylinders. This alloy is chosen because it is nonmagnetic and is readily available for production of the required grinding cylinders. Use of ball milling is necessary to obtain satisfactory pressed ferrite pieces if nitrate salt solutions are spray dried. That is, unmilled powder cannot be packed tightly enough in the mold prior to pressing to prevent production of cracked green pieces. Dry milling times of about 4 hours are sufficient to give the desired characteristics of the powder. Wet milling times of about 8 to 16 hours are usually required. However, wet milling is not as desirable as dry milling since the wet milled powder must be either vacuum filtered or dried through simple evaporation. Vacuum filtering is unsatisfactory since the fine particles soon clog the filter medium. Therefore, the preferred ball milling method is by dry ball milling in a rubber-line steel mill with stainless steel 304 cylinders for a time of about 4 hours. This dry milling time is considerably less than the 8 to 24 hours which are usually required in the wet milling procedure.

A mechanism believed to account for the higher fired densities obtained with ball milled powders is:

(1) Spray dried particles are hollow spheres somewhat like ping-pong balls.
(2) The forces on the particles during presintering and pressing are not sufficient to crush the spheres.
(3) Ball milling of these materials is predominately a crushing rather than grinding action, because little reduction of ultimate particle size can be observed microscopically.
(4) A larger mass of crushed (ball milled) spheres than round spheres can be packed into a given volume. The volume will contain more solid and less empty space when filled with crushed spheres.

(5) Pressing of samples

From the ball milled powder, ferrite toroids are isostatically pressed in silicone rubber molds. The rubber molds are cast by pouring a liquid rubber compound into aluminum molds using generally known techniques. A steel shim is inserted into the shim cavity of the bottom portion of the rubber mold and ferrite powder, ground to less than 100 mesh, is poured into the mold. The mold is considered filled when there is no settling of the powder as the mold and powder are tapped for several minutes. The mold top is then placed on the steel shim and pressed shut. The assembly is taped with waterproof tape to prevent leakage of the pressing medium into the mold. Several molds filled with powder are then placed in a chamber filled with an oil-water mixture and isostatically pressed at 25,000 p.s.i. at an approximate increase in pressure of 2500 p.s.i./min. The pressure is releasd at approximately 10,000 p.s.i./min. and the molds are removed and cleaned. The toroids are removed from the molds with the steel shims remaining in the toroids, then the shims are removed with pliers.

(6) Sintering of samples

The firing of samples to sinter them consist of raising the furnace temperature at 60° C. per hour to the desired firing temperature, holding for the desired time, then lowering the temperature at 60° C. per hour until the natural cooling rate becomes controlling. Alumina and mullite firing trays are used, and oxygen flows into the furnace at 3 s.c.f.h. during the entire cycle. The ferrites are preferably sintered at a temperature between 1300° and 1400° C. for a time from 4 to 6 hours. After the samples of ferrite are sintered, they are tested and used for the purposes desired.

EXAMPLE II

The production techniques for the garnet compositions yttrium-iron-garnet ($3Y_2O_3 \cdot 5Fe_2O_3$) and gadolinium-yttrium-iron-garnet ($2.1Y_2O_3 \cdot 0.9Gd_2O_3 \cdot 5Fe_2O_3$) are set forth hereinbelow.

(1) Solution preparation

Stock solutions of $Y(NO_3)_3$ and $Gd(NO_3)_3$ calculated to contain 25 percent by weight of nitrate salt are readily prepared by dissolving the respective oxide in the required mixture of nitric acid and water. The solutions contained 10 percent more $HNO_3$ than theoretically required, to assure complete dissolution of the oxide. Quantitative dissolution is desired to avoid the need for chemical analysis on the stock solutions.

Iron nitrate stock solution is prepared by dissolving reagent grade iron powder in nitric acid. High purity from powder does not dissolve readily in nitric acid. The iron nitrate stock solution is prepared by dissolving iron powder in nitric acid to which small quantities of hydrochloric and sulfuric acids are added. Complete dissolution is obtained. Iron nitrate solution may also be made by dissolving iron wire in dilute nitric acid. This approach can be accomplished without the addition of hydrochloric or sulfuric acid. After the stock solutions are prepared, they are mixed into proportions to give yttrium-iron-garnet ($3Y_2O_3 \cdot 5Fe_2O_3$) or gadolinium-yttrium-iron-garnet ($2.1Y_2O_3 \cdot 0.9Gd_2O_3 \cdot 5Fe_2O_3$).

(2) Spray drying

Spray drying conditions are chosen to closely match those used for ferrites. In garnet spray drying run GI, see Table III below, the feed solutions was diluted to contain about 12 weight percent metal nitrate salts rather than the usual 25 percent. Run numbers GI, GII, and GIII contained small amounts of hydrochloric and sulfuric acids which caused the resulting spray dried powders comparable to the ferrite spray dried powders.

Table III below lists the garnet spray drying conditions:

TABLE III.—GARNET SPRAY DRYER RUNS

| Run No. | Hot gas temp. Inlet (° F.) | Hot gas temp. Outlet (° F.) | Precursor solution Flow rate (gal./hr.) | Precursor solution Air press. (p.s.i.g.) | Precursor solution Quantity (gm.) | Dried powder Quantity (gm.) | Dried powder Loss on presintering[1] (w/o) | Ultimate particle size (μ) | Remarks |
|---|---|---|---|---|---|---|---|---|---|
| GI | 700 | 465 | 0.63 | 100 | 3,800 | 162 | | <1 | Feed solution 12 percent salts—powder was light green after calcining. |
| GII | 700 | >500 | 0.63 | 100 | 1,981 | 166 | | >1 | Light green powder after calcining. |
| GIII: | | | | | | | | | |
| A | 700 | >500 | ~0.5 | 80 | (2) | 30 | 57 [3](2,000R) | <1 | Do. |
| B | 700 | >500 | ~0.5 | 60 | (2) | 45 | 51 [3](2,000R) | <1 | Do. |
| C | 700 | >500 | ~0.5 | 80 | (2) | 75 | 49 [3](2,000R) | <1 | Do. |
| D | 700 | >500 | ~0.5 | 60 | (2) | 69 | 45 [3](2,000R) | <1 | Do. |
| GIV | 700 | >500 | ~0.5 | 100 | 589.4 | 66 | | <1 | $Y_{1.5}Fe_5O_{12}$, powder was reddish brown after calcining. |
| GV | 700 | >500 | ~0.5 | 100 | 718 | | | 1–3 | $Y_3Fe_5O_{12}$, contaminated by asbestos spray drier gasket. |
| GVI | 700 | >500 | ~0.5 | 100 | 729.2 | 62 | 39 [1](1,800R) | 1–3 | $Y_3Fe_5O_{12}$ powder was light brown after calcining. |
| GdI | 700 | >500 | ~0.5 | 100 | 3,702 | 354 | 30 | 2–10 | $Y_{2.1}Gd_{0.9}Fe_5O_{12}$, powder was dark green after calcining. |

[1] Data not obtained on some runs because of rotary calcining.
[2] Data not measured.
[3] Rotary calcined at 2,000° F. in air.

(3) Presintering

The great materials may be presintered in the open air furnace or in the rotary furnace as discussed in Example I above. The temperatures for presintering may range from 1400° F. to 2000° F. The preferred range for presintering the garnet material is 1750–2000° F.

(4) Milling

Because of the small particle size, it was not necessary to ball mill the garnets made with hydrochloric and sulfuric acid; but the powder had to be consolidated with water using a pelletizing technique so the toroids could be pressed. The runs made with the dilute nitric acid had to be ball milled using the same process used in ball milling the ferrites because of the larger powder particle size.

Otherwise, ball milling of the garnet material is accomplished in the same manner as set forth in ferrities in Example I supra.

(5) Forming of material

The garnet material is formed in the same manner as that set forth for the ferrites in Example I supra.

(6) Sintering of garnet material

This material is sintered in the same manner as that for ferrities supra except the firing temperature for the garnet material is preferably from 1450° C. to 1550° C.

It is obvious that various chemical compositions of the ferrite and garnet materials can be made by merely varying the percentage of ingredients of each element used to form the desired garnet or ferrite material. The produced products may be tested as desired and used such as in phasers in electronically scanned arrays.

We claim:

1. A process for producing ferrite and garnet materials for microwave type devices; said process comprising measuring the appropriate materials from solutions containing the appropriate metal salts for forming a composition selected from the group consisting of yttrium-iron-garnet, gadolinium-yttrium-iron-garnet and the ferrite $(Fe_2O_3)\cdot(MgO)_{1.611}\cdot(MnO)_{0.128}$, mixing said salt solutions to form a master solution, spray drying said master solution in a heated air atmosphere at a temperature up to about 750° F. and that is continuously flowing in the spray dryer to cause a powder material to form, in an air atmosphere and at a temperature between about 1200° F. to about 2000° F. for up to about four hours to cause said powder material to be converted to metal oxides with particular spinel or garnet crystal structures, forming said presintered material into the desired shape, and finally, sintering said shaped material at a temperature between about 1300° C. to about 1550° C. in an atmosphere selected from the group consisting of air and oxygen and for a time of about 4 to about 6 hours.

2. The process as set forth in claim 1, wherein said presintered material is dry ball milled for up to about four hours to break up the particles before being shaped.

3. The process as set forth in claim 1 wherein, said master solution contains from about 10 to 30 percent by weight metal salts with the remainder being water.

4. The process as set forth in claim 1 wherein, said spray dried powder is presintered in a rotary presintering apparatus at a temperature of about 1400° F. and for a time of about 20 to about 25 minutes.

5. The process as set forth in claim 1 wherein, said powders are formed to the desired shape by placing the material into a container of the desired shape and then subjecting the material and the form to pressure sufficient to form the material.

6. The process as set forth in claim 1, wherein said selected composition is yttrium-iron-garnet, wherein said master solution contains about 12 weight percent metal nitrate salts and the remainder water, wherein said powder material is presintered in a rotary presintering apparatus for a time of about 20 to about 25 minutes, and wherein said presintered material is formed to the desired shape by placing the material into a container of the desired shape and then subjecting the material and the form to pressure sufficient to form the material.

7. The process as set forth in claim 1, wherein said selected composition is gadolinium-yttrium-iron-garnet, said master solution contains about 12 weight percent metal nitrate salts with the remainder being water, wherein said presintered material is presintered by a rotary presintering apparatus in an air atmosphere, and wherein said material is sintered at a temperature of about 1450° C. to about 1550° C.

8. The process as set forth in claim 1, wherein said selected composition is the ferrite $$(Fe_2O_3)\cdot(MgO)_{1.611}\cdot(MnO)_{0.128}$$

said master solution contains about 25 weight percent metal nitrate salts with the remainder being water, wherein said presintered material is presintered by a rotary presintering apparatus in an air atmosphere at a temperature of about 20 to about 25 minutes, and wherein said material is sintered in an air atmosphere at a temperature between about 1300° C. to about 1400° C. for about 4 to 6 hours.

References Cited

UNITED STATES PATENTS

| | | | |
|---|---|---|---|
| 3,645,672 | 2/1972 | Cowlard et al. | 252—62.56 X |
| 3,378,335 | 4/1968 | Ellis et al. | 252—62.56 X |
| 3,197,412 | 7/1965 | Gyorgy et al. | 252—62.57 |
| 3,419,496 | 12/1968 | Vassiliev et al. | 252—62.57 |
| 3,002,929 | 10/1961 | Van Nitert | 252—62.64 X |

FOREIGN PATENTS

| | | | |
|---|---|---|---|
| 644,639 | 10/1950 | Great Britain | 252—62.62 |
| 664,086 | 1/1952 | Great Britain | 252—62.56 |

OSCAR R. VERTIZ, Primary Examiner

J. COOPER, Assistant Examiner

U.S. Cl. X.R.

252—62, 64; 423—263, 594